United States Patent
Bédard et al.

(10) Patent No.: US 7,230,352 B2
(45) Date of Patent: Jun. 12, 2007

(54) COMPACT POWER SUPPLY

(75) Inventors: Stéphane Bédard, Saint-Augustin-de-Desmaures (CA); Sylvain Gagné, Sainte-Catherine de la Jacques-Cartier (CA)

(73) Assignee: Victhom Human Bionics Inc., Quebec (CA)

( * ) Notice: Subject to any disclaimer, the term of this patent is extended or adjusted under 35 U.S.C. 154(b) by 330 days.

(21) Appl. No.: 10/743,231

(22) Filed: Dec. 22, 2003

(65) Prior Publication Data

US 2005/0105226 A1    May 19, 2005

Related U.S. Application Data

(60) Provisional application No. 60/520,640, filed on Nov. 18, 2003.

(51) Int. Cl.
  *H02J 1/10*   (2006.01)
  *H02J 7/34*   (2006.01)
(52) U.S. Cl. ............................ 307/59; 307/52; 307/109
(58) Field of Classification Search ................ 307/52, 307/59, 109
  See application file for complete search history.

(56) References Cited

U.S. PATENT DOCUMENTS

| | | | |
|---|---|---|---|
| 5,153,496 A | 10/1992 | LaForge | 320/17 |
| 5,422,558 A | 6/1995 | Stewart | 320/7 |
| 5,504,415 A | 4/1996 | Podrazhansky et al. | 320/18 |
| 5,656,915 A | 8/1997 | Eaves | 320/6 |
| 5,982,156 A * | 11/1999 | Weimer et al. | 323/222 |
| 5,998,930 A * | 12/1999 | Upadhyay et al. | 315/106 |
| 6,061,577 A | 5/2000 | Andrieu et al. | 455/572 |
| 6,373,152 B1 | 4/2002 | Wang et al. | 307/150 |
| 6,451,481 B1 * | 9/2002 | Lee et al. | 429/218.1 |
| 2004/0263127 A1* | 12/2004 | Turner et al. | 320/166 |

FOREIGN PATENT DOCUMENTS

| | | | |
|---|---|---|---|
| EP | 0718951 A | 6/1996 | |
| EP | 0902547 A | 3/1999 | |
| EP | 1107420 A | 6/2001 | |
| FR | 2816463 A | 5/2002 | |
| WO | WO03/088373 A | 10/2003 | |

* cited by examiner

*Primary Examiner*—Robert L. Deberadinis
*Assistant Examiner*—Hal I. Kaplan
(74) *Attorney, Agent, or Firm*—Timothy J. Keefer; Seyfarth Shaw LLP

(57) ABSTRACT

The present invention discloses an electrical power supply for providing electrical power to a load, the power supply comprising a plurality of energy storage elements each having a different operating characteristic and connected in an electrical circuit to the load, and a circuit element interposed between at least one of the storage elements and the load and operable to segregate the energy storage elements therefrom, the circuit element being selected to match supply of energy to the load to the characteristics of the storage elements.

17 Claims, 7 Drawing Sheets

COMPACT POWER SUPPLY

CROSS REFERENCE TO RELATED APPLICATION

This application claims the priory of U.S. provisional patent application Ser. No. 60/520,640 filed on Nov. 18, 2003.

TECHNICAL FIELD

The present invention relates to a power supply.

BACKGROUND

A battery is formed of individual cells, each of which produces a voltage and current output. The cells are arranged in series or parallel arrays to form the power supply that is capable of producing the required voltage and current output of the power supply.

Cells may be constructed from a variety of materials and configurations, each of which has a particular set of operating characteristics. For example, some constructions may be particularly well suited to supplying current at a consistent voltage over an extended period but unsuitable for high transient loads, whereas others are better suited for such loading. It is usual to select a cell construction best suited to the duty cycle to which it will be subjected.

In many applications the duty cycle is consistent and repetitive allowing a particular cell construction to be used to satisfy the demands. In other applications, the duty cycle may vary dramatically and inconsistently making cell selection more difficult. To further complicate the selection many applications that require high peak currents also have volume and weight constraints, for example power tools, hobby planes and race carts to name a few. A particularly demanding application addressed by the applicants is a powered leg prosthesis where the battery is needed to power an actuator and move the user. For many of those applications that have high peak current requirements, the number of batteries required to satisfy the maximum peak current would not fit inside the available volume. There is thus a need for a compact power supply that can meet varying demands and deliver high quantities of energy within a short amount of time, and fit inside a very limited volume.

Accordingly, it is an object of the present application to obviate or mitigate some or all of the above disadvantages.

SUMMARY

According to the present invention, there is provided an electrical power supply for providing electrical power to a load, the power supply comprising:
  a plurality of energy storage elements each having a different operating characteristic and connected in an electrical circuit to the load;
  a circuit element interposed between at least one of the storage elements and the load and operable to segregate the one of the energy storage elements therefrom, the circuit element being selected to match supply of energy to the load to the characteristics of the storage elements; and
  a power monitoring unit to monitor at least one of said energy storage elements and vary the demand thereon from said load.

BRIEF DESCRIPTION OF THE FIGURES

An embodiment of the invention will now be described by way of example only with reference to the accompanying drawings, in which.

DETAILED DESCRIPTION

Figure 1:
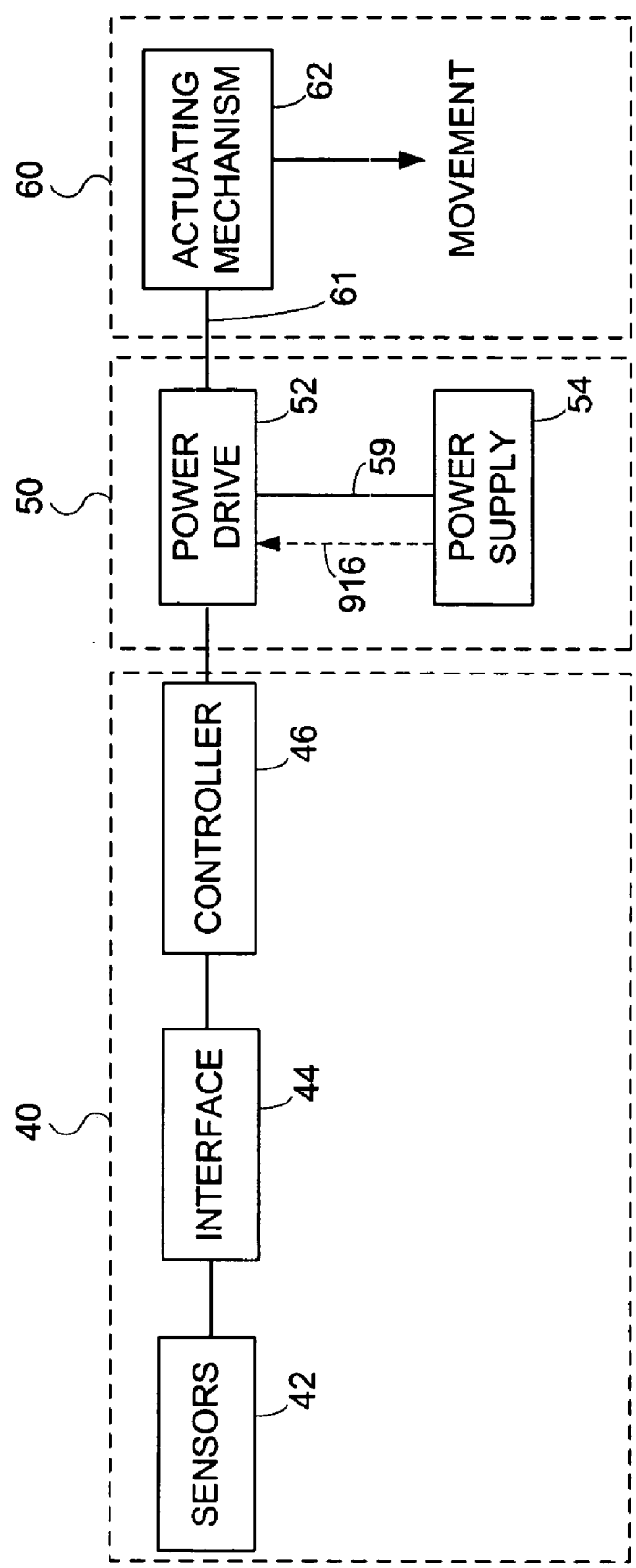
FIG. 1 is a block diagram showing a control system for a prosthesis having an actuating mechanism.

Referring to FIG. 1, a control system (40) controls the supply of electrical power from a power pack (50) to an active prosthesis (60). Unlike conventional prosthesis, an active prosthesis (60) is designed to supply the mechanical energy necessary to move by itself. The purpose of the control system (40) is to provide the required signals to operate the control of the actuating mechanism (62), for example an electric motor, of the active prosthesis (60) in the required manner. The sensors (42) capture information, in real time, about the dynamics of the amputee's locomotion and provide that information to the controller (46) via interface (44). The controller (46) determines the joint trajectories and the required force or torque that must be applied by the actuating mechanism (62) in order to provide coordinated movements. The control system (40) then generates output signals which are used to regulate the power supplied to the actuating mechanism (62) from a power pack (50).

Power pack (50) includes a power drive (52) which is itself connected to a power supply (54) to supply energy to actuating mechanism (62) in order to create the required movements. The power supply (54) and power drive (52) interact through a saturation control line (916) to control the amount of power being provided by the power drive (52) to the actuating mechanism (62) through power lines (61). The power drive (52), may be for example, but is not limited to the following model, a PIC25/50 from ELMO Motion Control. An example of a control system (40) using sensors (42) is described in U.S. patent application Ser. No. 10/600,725 filed Jun. 20, 2003, entitled "CONTROL SYSTEM AND METHOD FOR CONTROLLING AN ACTUATED PROSTHESIS", by Stéphane Bédard, and examples of active prosthesis are described in U.S. patent application Ser. No. 10/463,495 filed Jun. 17, 2003, entitled "ACTUATED PROSTHESIS FOR ABOVE-KNEE AMPUTEES", by Stéphane Bédard et al., the entire disclosures of which are hereby incorporated by reference herein.

Figure 4:
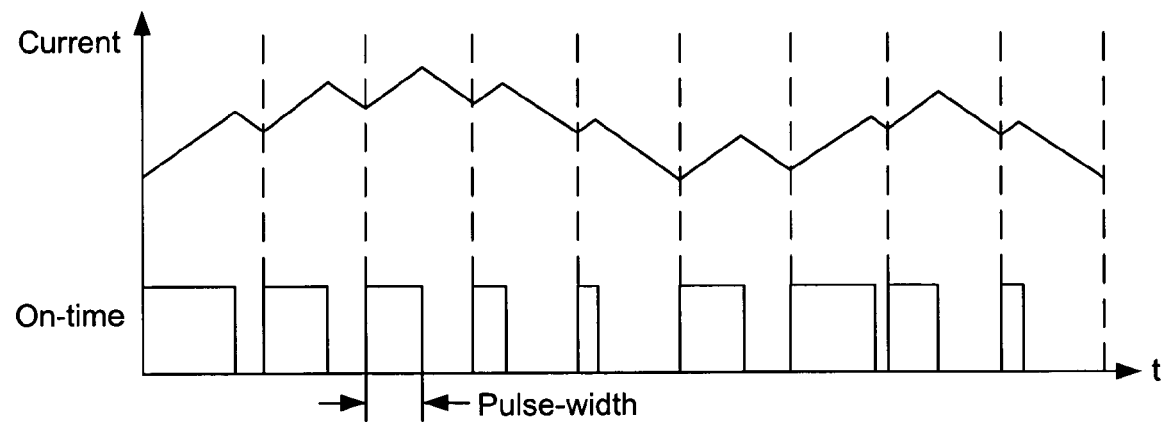
FIG. 4 is a graph of a high-frequency Pulsed Width Modulation (PWM) signal.
Figure 5:
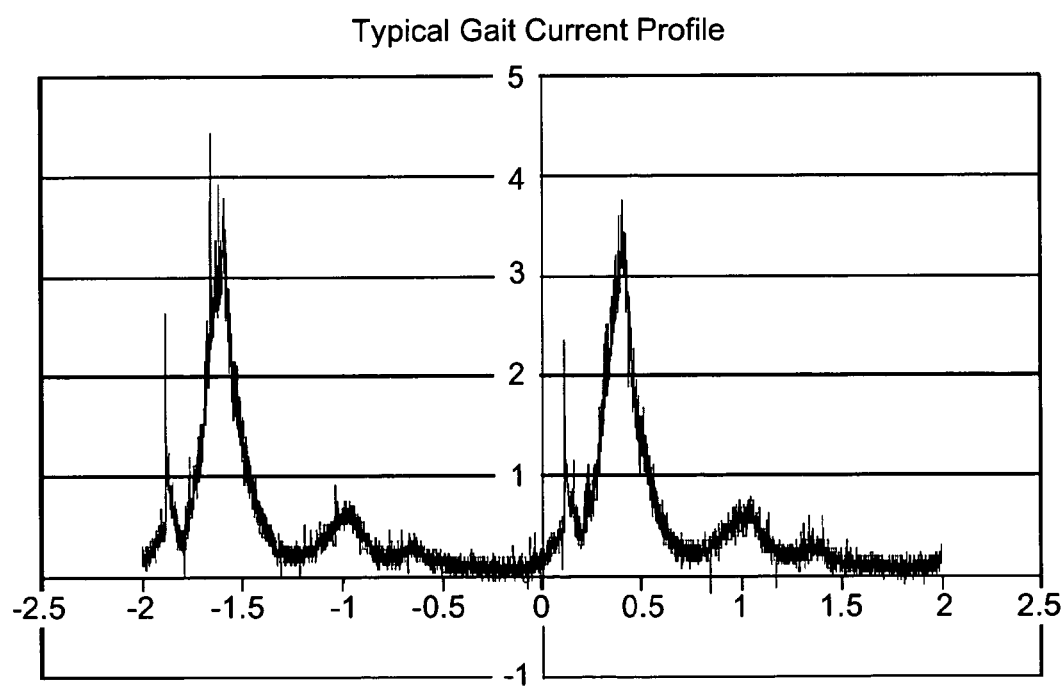
FIG. 5 is a graph of a typical gait current profile.

The current required for operation of the actuating mechanism (62) may be divided in two major current profiles as shown on FIGS 4 and 5. A first current profile is a relatively high-frequency Pulsed Width Modulation (PWM) signal. The PWM signal is a high-efficiency control signal that has a wide spread use in motor control. The period of a PWM signal always remains the same, but the signal duty cycle (ON/OFF ratio) may vary over time as illustrated in FIG. 4. The outputs of the power drive (52) that feed the actuating mechanism (62) are of the PWM type. The required energy taken by the power drive (52) to fulfill this profile must come from the power supply (54).

Figure 2:
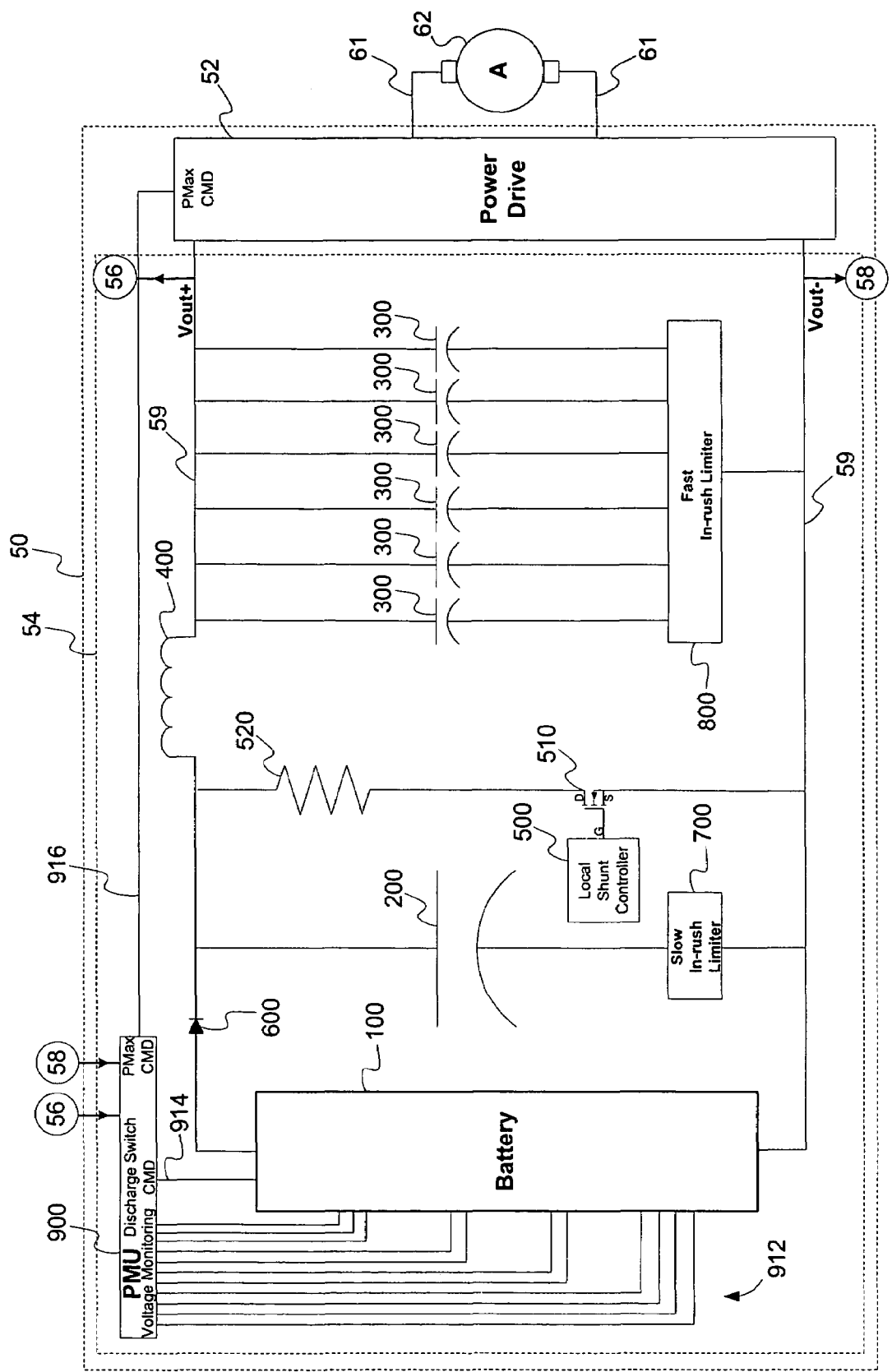
FIG. 2 is a schematic block diagram of a power pack.

A second current profile is a low frequency one. It is the main current that reproduces the amputee's gait or movement, in the case of an active prosthesis (60). This profile, an example of which is illustrated in FIG. 5, may be relatively high current but of short duration and has a sine wave-like form on normal gait operation. It will be seen therefore that the current demands imposed on the power supply vary and to satisfy these demands. The power supply is organized as shown in greater detail in FIG. 2.

It is to be understood that like reference numerals refer to the same parts throughout the specification and drawings.

Power Storage Elements

The power supply (54) has energy storage elements of different characteristics, namely a battery (100), a super capacitor (200) and electrolytic capacitors (300). The storage elements are connected in parallel to the power drive (52) by a bus (59) connected to terminals (56, 58). The first profile, the high-frequency Pulsed Width Modulation (PWM), is most suitably addressed by electrolytic capacitors (300), while the second profile, the low frequency one, is most suitably addressed by battery (100) and super capacitor (200). The storage elements are functionally segregated by an inductor (400) that is interposed in the bus (59) to limit the current flow from battery (100) and super capacitor (200) in specific cases, which will be discussed later. The inductor (400) acts to delay the supply of current from the battery (100) and superconductor (200) and, accordingly current is supplied preferentially by discharge of the parallel electrolytic capacitors (300).

Power supply (54) also includes power protection/management elements. The power protection/management elements include a local shunt controller (500) with associated switch (510) and resistor (520), diode (600), slow in-rush limiter (700), fast in-rush limiter (800) and Power Management Unit (PMU) (900). As will be described further below, battery (100) also includes protection elements and management elements.

The shunt controller (500) and associated switch (510) and resistor (520) are included to prevent large voltage induction across the power supply (54) Vout+ (56) and Vout− (58) terminals during energy regeneration phases. The diode (600) protects battery (100) from reverse currents on the power supply (54) bus (59) during those same phases. Moreover, when the power supply (54) is powered on after a certain period of inactivity the super capacitor (200) and electrolytic capacitors (300) will be fully discharged. The slow in-rush limiter (700), and fast in-rush limiter (800) are therefore used to limit in time the current drain on the battery (100) resulting from the super capacitor (200) and electrolytic capacitors (300), respectively.

The characteristics of the energy storage elements are determined by their internal construction as described more fully below.

Battery

Figure 3:
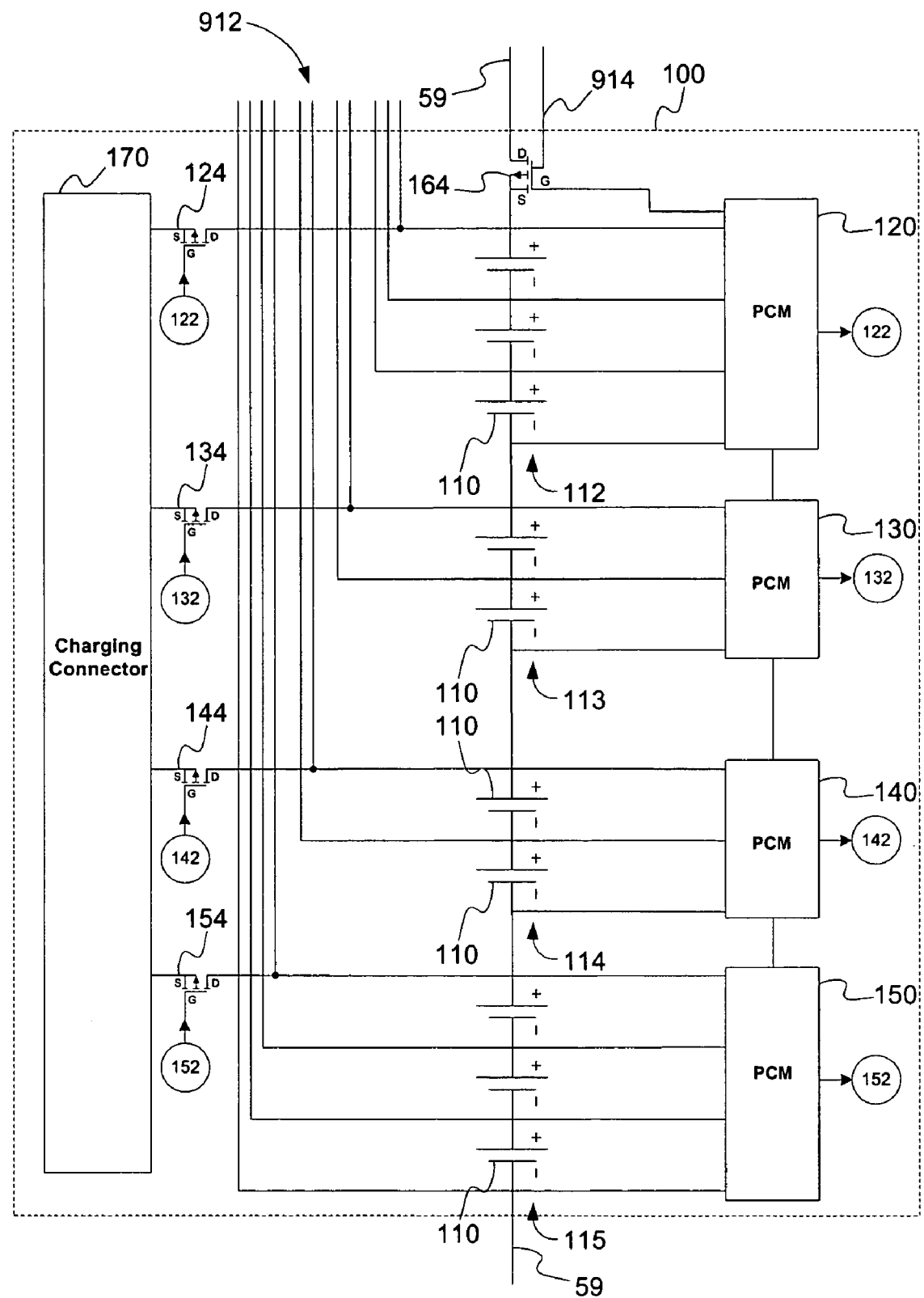
FIG. 3 is a schematic block diagram of the battery included in FIG. 2.

Referring to FIG. 3, battery (100) includes 10 battery cells (110), such as high-energy density Lithium Polymer (Li-Pol) cells, for example, but is not limited to the following model, SLPB36495-HD cells manufactured by Kokam Engineering. Battery cells (110) are configured serially, this arrangement allowing for a relatively high voltage to be used (nominal 37V, maximum 42V when fully charged) as well as allowing the use of high current (power). These cells (110) are well suited for the example application of an active prosthesis (60) in that they enable the discharge of high currents of up to 10 times (10C, where C is the battery (100) capacity and 1C mA=2000 mA) the cell's (110) nominal one, or in any other applications requiring high peak currents. This performance enables a reduction in the number or required cells (110) inside the battery (100) because of the ability of the cells (110) to deliver higher currents than their nominal one. As well, it offers an advantageous volume-over-performance solution, and allows for a relatively compact design, which is an important factor in the case of an active prosthesis (60) or any other electric or electronic device having limited available space for a power supply.

Other types and number of battery cells in various configurations may be used. For example, in an alternate embodiment, 30 SLPB393452-H high-energy density Lithium Polymer (Li-Pol) cells, manufactured by Kokam Engineering, may be configured in three parallel strings of 10 serially connected battery cells each.

Of course, the battery (100) is required to match the power supply requirements of the power drive (52) to deliver power within its operation range, thus, depending on the application, the number and configuration of battery cells (110) may vary accordingly. Battery (100) further includes charging connector (170) to connect the battery cells (110) to a power source for recharging.

In the example of an active prosthesis (60) application, it is supposed that, but not limiting the current description to the following specification, an actuating mechanism (62), such as an electric motor, has a typical voltage requirement of about 36V and a maximum peak current of about 18A. Since one battery cell (110) has a nominal voltage of 3.7V, this means that about 10 serial battery cells (110) are required. The normal operation voltage of a single battery cell (110), however, changes from 4.2V (fully charged) to 3.0V (fully discharged), and accordingly the cells are monitored in order to identify possible adverse operating conditions.

The battery cells (110) are monitored using protection circuit modules (PCM) (120, 130, 140 and 150), such as, for example, but is not limited to the following model, MAX1666 PCMs manufactured by Maxim. An individual PCM (120, 130, 140 and 150) monitors an associated cell group (112, 113, 114 and 115), comprising 2 or 3 battery cells (110) in series, by measuring voltages, charge and discharge currents. In a charging mode, when a PCM (120, 130, 140 and 150) detects a noticeable voltage change or an over current condition, it protects the monitored battery cells (110) by disabling the use of its associated cell group (112, 113, 114 and 115) by controlling its associated charging protection switch (124, 134, 144 and 154) through respective control lines (122, 132, 142 and 152). During discharge mode, a detection of an adverse condition in one group of cells opens the discharging protection switch (164) to prevent further current supply. The PCMs (120, 130, 140 and 150) return to bypass mode (switches closed) when associated cell groups (112, 113, 114 and 115) reach their protection release voltage or current.

Super Capacitor

A high-energy storage element, the super capacitor (200), is used to limit the peak current contribution of the battery (100). The super capacitor (200) can deliver high quantities of energy within a very short amount of time, which is a different behavior than that of the battery (100). Batteries are considered high-energy elements because they can store higher energy inside their volume but do not have the same ability to deliver it as quickly. Thus, high frequency in-rush currents are partially delivered by the super capacitor (200), for example, but is not limited to the following model, a THQ3050243 from Evans Capacitor. It has been evaluated that 24 mF were sufficient for the example application.

Special care should be taken regarding the super capacitor's (200) Equivalent Serial Resistor (ESR) as it should be kept as low as possible. The expected values for one super capacitor (200) should stand in mΩ and lower than 1Ω for the whole group in the case where multiple super capacitors (200) are used. High ESR results in lower instantaneous available current, which means that the battery (100) would have to provide a higher current contribution.

Electrolytic Capacitors

The electrolytic capacitors (300) are high-energy storage elements used to limit the peak current contribution of the battery (100) as well as for PWM filtering. Similarly to the super capacitor (200), the electrolytic capacitors (300) can deliver high quantities of energy within a very short amount of time, which is a different behavior than that of the battery (100). Thus, high frequency in-rush currents are partially delivered by the electrolytic capacitors (300), for example, but not limiting the current description to the following model, EEUFC1J471L capacitors from Panasonic. In the ongoing example, for volume considerations, the use of smaller electrolytic capacitors (300) has been preferred, in this case capacitors having an individual capacity of 0.47 mF for a total capacity of 2.82 mF (six electrolytic capacitors (300) in parallel). Additional benefits come from this paralleling of the electrolytic capacitors (300), notably the ESR is reduced by a factor of six while the capacity and maximum current are increased by a factor of six.

Inductor

As noted above, the energy storage elements with the different characteristics are segregated by the inductor (400). The role of the inductor (400) is to delay and therefore limit the current contribution of the battery (100) and super capacitor (200) when peak high-frequency current conditions occur. The inductor (400) is located between power drive (52) and super capacitor (200) because the power drive (52) potentially induces high frequency noises (and therefore currents) and super capacitors do not perform well under high frequency conditions. Inductor (400) plays the same role for the battery (100). Enough inductance should be used in order to allow an acceptable contribution limitation of the low-frequency sub-system, i.e. battery (100) and super capacitor (200). By reducing the current contribution of the low-frequency sub-system, battery (100) and super capacitor (200), the inductor (400) forces the electrolytic capacitors (300) to deliver their energy into power drive (52). In the example application of an active prosthesis (60), the inductor (400) may be, for example, but is not limited to the following model, a DC780-153K inductor from API Delevan. It should be noted that the selected inductor (400) must have an incremental current value that matches the application's worst-case current, which is approximately 18A in the given example.

Power Protection/Management Elements

Shunt Controller

In certain situations, the power supply (54) will absorb energy from the active prosthesis (60) instead of delivering it, such a situation is referred to as a regeneration phase. A regeneration phase occurs, for example, when the active prosthesis' (60) user is descending stairs. The effects of a regeneration phase on the power supply (54) is an energy return on its elements, which energy may be used to recharge the super capacitor (200) and the electrolytic capacitors (300). However, once the super capacitor (200) and the electrolytic capacitors (300) have been fully recharged, the voltage across Vout+ (56) and Vout− (58) may continue increasing, which may be damaging. To protect the super capacitor (200) and the electrolytic capacitors (300), the shunt controller (500) monitors the voltage across Vout+ (56) and Vout− (58) in order to determine if a preset maximum voltage level has been attained. Whenever the monitored voltage goes above the preset maximum voltage level, the shunt controller (500) closes switch (510), which results in the absorbed energy being dissipated into resistor (520). Conversely, whenever the monitored voltage goes below the preset maximum voltage level, shunt controller (500) opens switch (510).

Diode

During a regeneration phase, as discussed above, the impact on the power supply (54) is an energy return on its elements, which may be damageable for the battery (100). The diode's (600) purpose is to protect the battery (100) from such energy returns by stopping reverse currents on the power supply (54) bus (59).

In-Rush Limiters

When charging the super capacitor (200) and electrolytic capacitors (300) from the battery (100), for example when the power supply (54) is powered on after a certain period of inactivity having had for effect the full discharge of the super capacitor (200) and electrolytic capacitors (300), a very high and fast power drain is experienced by the battery (100). This results in a power drain which may exceed the maximum allowable power available, thus causing the PMU to disconnect the battery (100) from the bus (59) in order to protect the battery (100) from an over discharge situation. To prevent such a situation from happening, a slow in-rush limiter (700) and a fast in-rush limiter (800) limit in time the current drain of the super capacitor (200) and electrolytic capacitors (300), respectively, on the battery (100).

The slow in-rush limiter (700) and fast in-rush limiter (800) may be based, for example, on N-Channel D$^2$PAK power mosfets that will let the voltage increase linearly across the super capacitor (200) and electrolytic capacitors (300), respectively. A simple way to proceed is to adjust the charging time so as to obtain a nearly steady-state acceptable power.

Power Management Unit (PMU)

Figure 6:
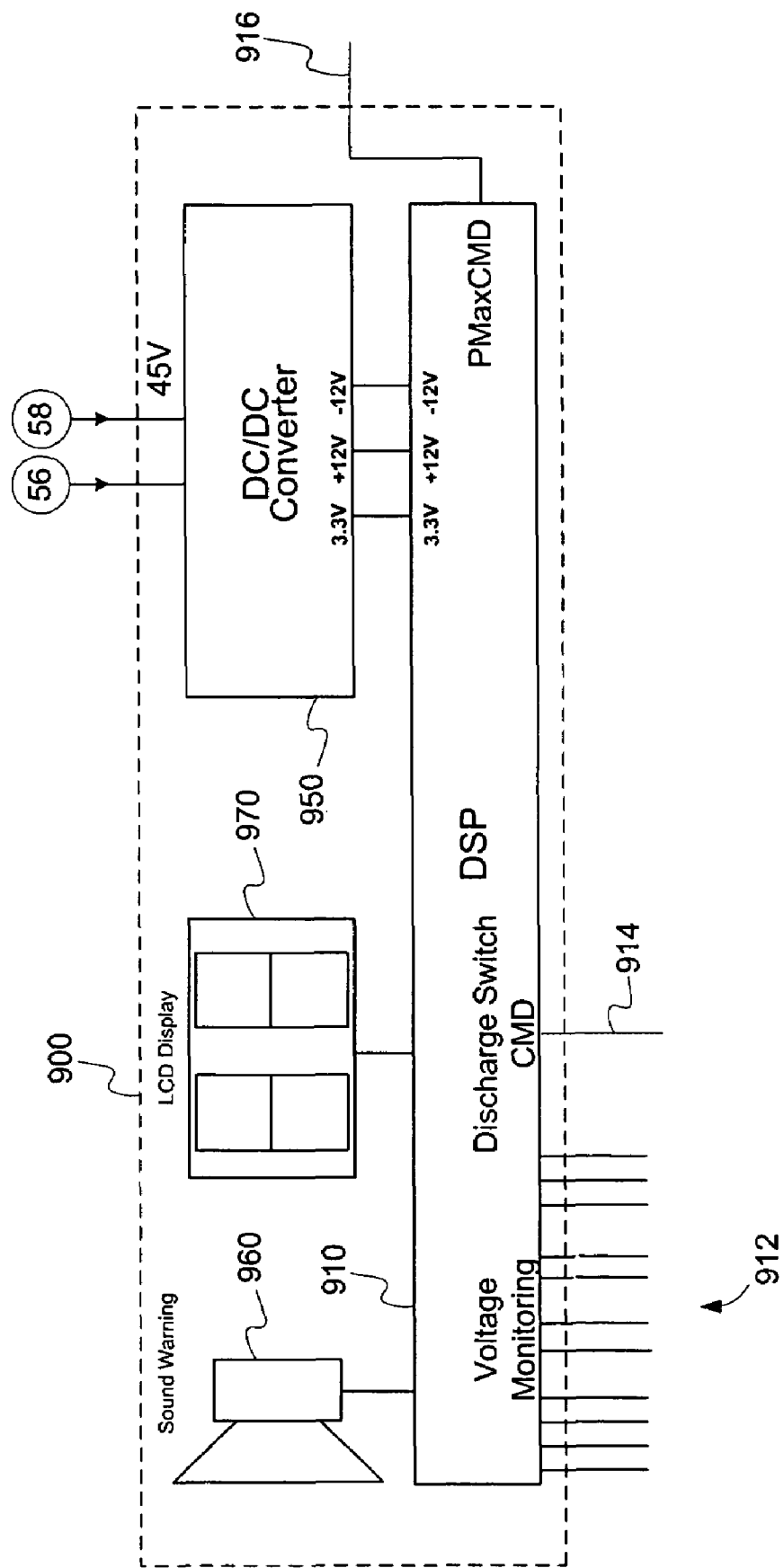
FIG. 6 is a schematic block diagram of the Power Management Unit (PMU) included in FIG. 2.

Although the organisation of the storage elements will enable the appropriate elements to supply current to the actuating mechanism (62), further enhancement and control may be obtained from the power management unit (PMU) (900). The PMU (900), which is shown in FIG. 6, is a controller whose purpose is to determine the maximum allowable power available from battery (100), open or close discharging switch (164) using discharge switch control line (914) and set the power drive (52) power saturation command using power saturation control line (916). The signal on power saturation control line (916) is indicative of the power available from the battery (100) and is used by the power drive (52) to select the optimum control signal for the actuating mechanism (62).

The PMU (900) includes a Digital Signal Processor (DSP) (910), optional audio warning (960) and LCD display (970) low power level indicators and a DC/DC converter (950). The optional audio warning (960) and LCD display (970) low power level indicators are not required to be part of the PMU (900) or even to be located on the power supply (54), they may also be, for example, remotely located.

Figure 7:
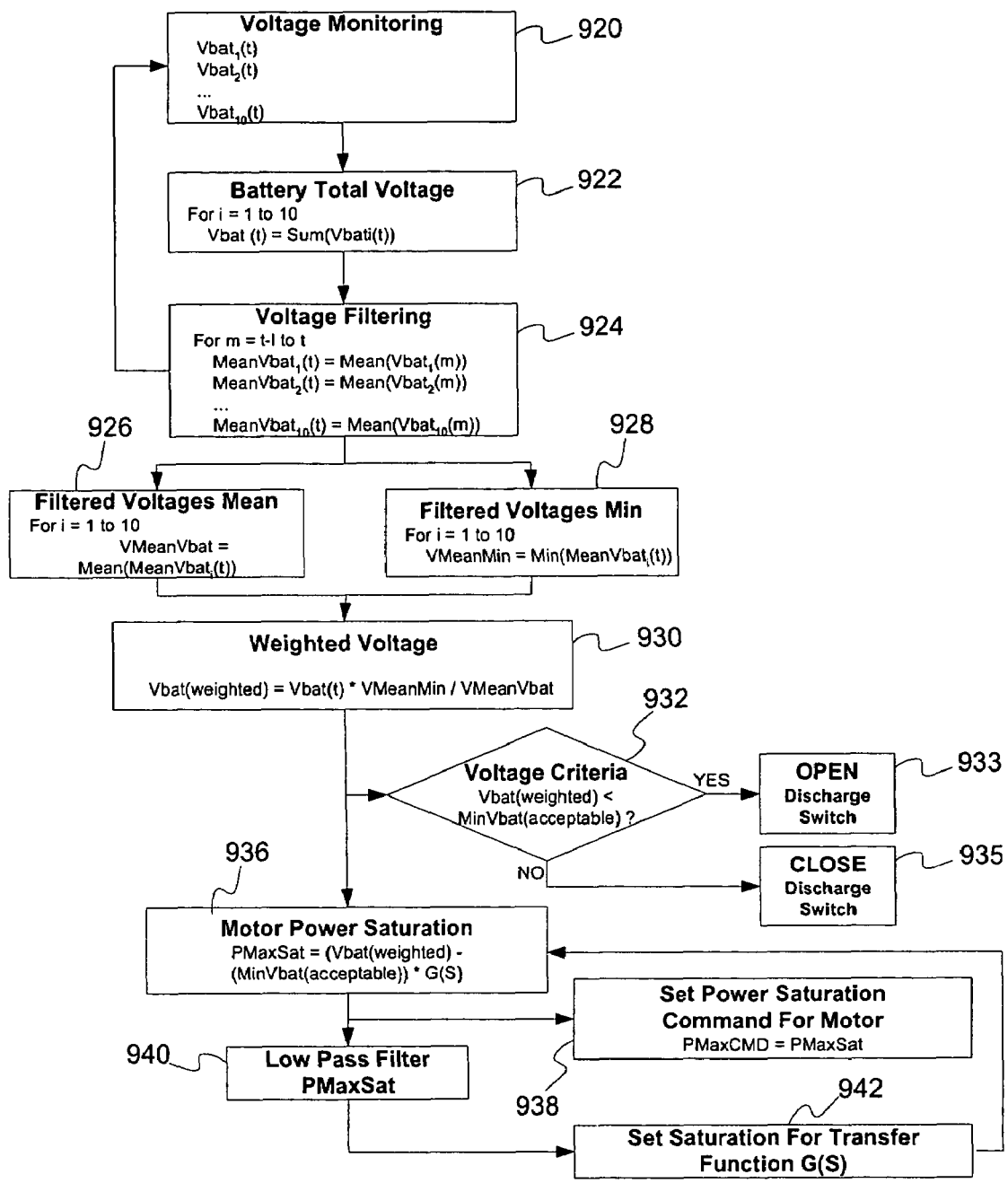
FIG. 7 is a flow diagram of the PMU algorithm.

The DSP (910) includes a state machine that monitors, in real-time, the voltages of the battery cells (110) through monitoring lines (912). As the condition of the battery cells (110) change, the DSP (910) executes an algorithm to determine the appropriate level for the power saturation control line (916). An example of an algorithm that may be executed by the DSP (910) is depicted by the flow chart shown in FIG. 7. The sequence of steps composing the algorithm is indicated by the sequence of blocks (920) to (942).

In block (920) the algorithm starts by monitoring the instantaneous voltage, at time sample "t", of the individual battery cells (110), $Vbat_i(t)$, through monitoring lines (912) and computes, at block (922), the total instantaneous voltage of the battery (100), Vbat(t), by summing all the instantaneous voltages of the individual battery cells (110).

At block (924), the algorithm proceeds to compute, for each battery cell (110), the average voltage for the last "l" time samples, $MeanVbat_i(t)$. This step serves to filter out sharp rises or drops in voltage that may briefly appear and may not be representative of the state of the individual battery cells (110).

At block (926), the average of the $MeanVbat_i(t)$ for all battery cells (110), VmeanVbat, is computed. In parallel to block (926), block (928) identifies the minimum of the $MeanVbat_i(t)$, for all battery cells (110), which results in VmeanMin.

Then, at block (930), the weighted voltage, Vbat (weighed), is computed by multiplying the total instantaneous voltage, $Vbat_i(t)$, by a weighting factor equal the ratio of the minimum of the average voltages for the last "l" time samples over the average of the those average voltages. The purpose of this weighting factor is to take into account possible voltage discrepancies amongst the individual battery cells (110). Of course, other weighting factors may be used to represent specific conditions of the power supply.

At block (932), the algorithm checks if the weighted voltage, Vbat(weighted), is below a minimal acceptable voltage, MinVbat(acceptable), which is a threshold indicative of a minimal operationally safe voltage level below which damage may start accruing to the battery (100) or some of its constituent battery cells(110). If Vbat(weighed) is below MinVbat(acceptable), then, at block (933), the algorithm opens the discharge switch (164), through discharge switch control line (914), 50 has to disconnect the battery (100) from the bus (59). On the other hand, if Vbat(weighed) is not below MinVbat(acceptable), then, at block (935), the algorithm closes the discharge switch (164), through discharge switch control line (914), so as to connect the battery (100) to the bus (59).

Figure 8:
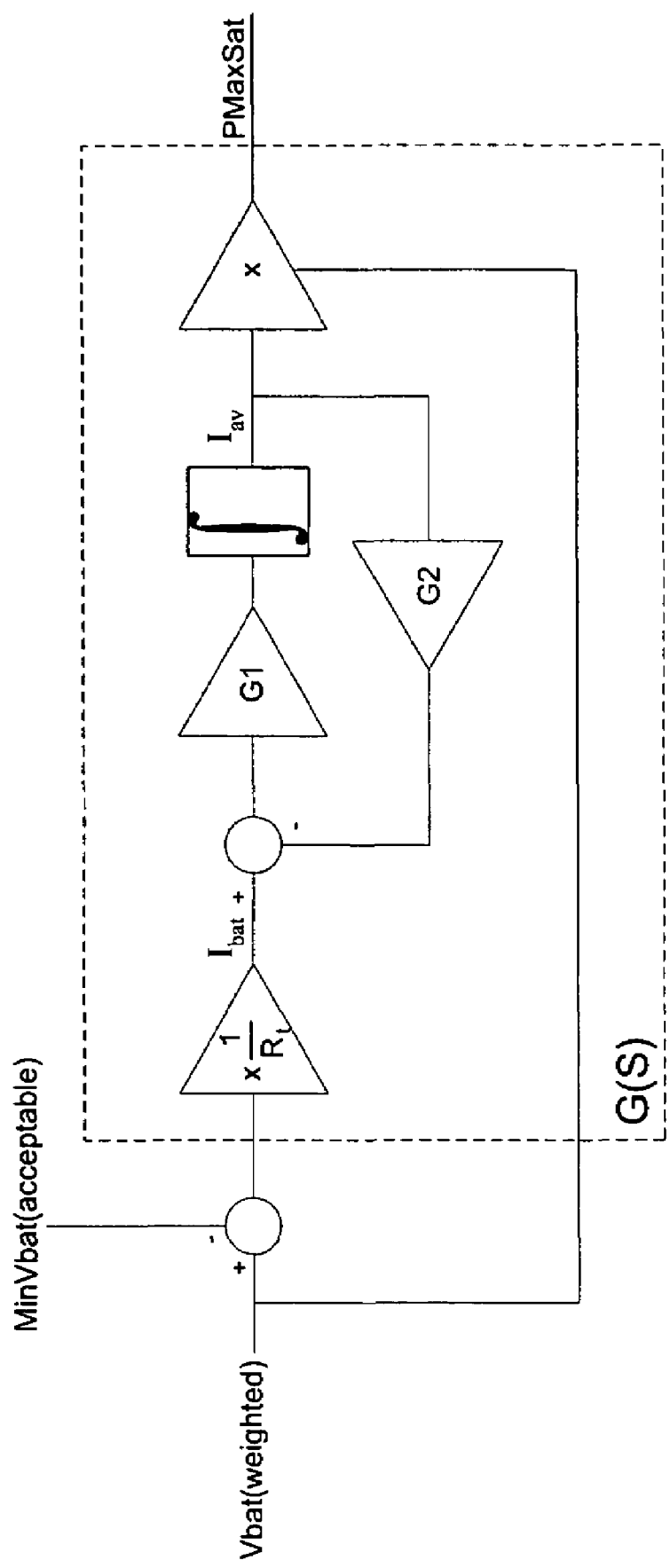
FIG. 8 is a block diagram of the G(S) transfer function.

At block (936), the actuating mechanism's (62) power saturation level, PMaxSat, is computed by multiplying the difference between the weighted voltage, Vbat(weighed), and the minimal acceptable voltage, MinVbat(acceptable), by transfer function G(S) which implements a current regulator. FIG. 8 shows a block diagram of the G(S) transfer function in which:

$$I_{bat} = \frac{Vbat(\text{weighted}) - MinVbat(\text{acceptable})}{R_t} \quad \text{Equation 1}$$

where:
$I_{bat}$ is the battery (100) current, $R_t$ is the battery (100) equivalent resistance;

$$I_{av} = I_{av} + \frac{G_1(I_{bat} - G_2 I_{av})}{F} \quad \text{Equation 2}$$

where:
$I_{av}$ is the available current,
$G_1$ and $G_2$ are gain functions,
F is the sampling frequency;
and:

$$P\max \text{Sat} = I_{av} \cdot Vbat(\text{weighted}). \quad \text{Equation 3}$$

The gain functions $G_1$ and $G_2$ of Equation 2 may be computed as:

$$G_2 = 1/G_A \quad \text{Equation 4}$$

$$G_1 = 2\pi f_c / G_2$$

where:
$G_A$ is the desired gain of the system, and
$f_c$ is the desired cut-off frequency of the system;
the system being the battery (100) and the load, in this case the power drive (52).

The algorithm then sets the actuating mechanism's (62) power saturation level of the power drive (52), at block (938), by sending a power saturation command, PMaxCMD, to the power drive (52) through power saturation control line (916).

At block (940), a low pass filter is applied to PMaxSat, the purpose of the lowpass filter is to introduce a certain delay in time so as to eliminate small rapid variations in the PMaxSat values. Following the low pass filtering of PMaxSat, at block (942), the transfer function G(S) is dynamically adjusted in response to the available power.

Typically, the DSP (910) requires a single 3.3V and a dual +/−12V power supplies to operate. This power may be provided by converting a portion of the power drive's (52) available power into the required DSP (910) power levels using a DC/DC converter (950), for example, but is not limited to the following model, a DATEL TWR-3.3/4-12/300-D4. An advantage of using a DC/DC converter (950) is the possibility of isolating the DSP (910) from the power source, i.e. the battery (100). Other possible approaches would be to make an equivalent converter using discrete electronic elements, instead of a modular block, integrated as a converter or having an additional power supply dedicated to the DSP (910).

Regarding the warning to user when approaching end of autonomy time of the battery (100), an audio warning (960) and/or an LCD display (970) may be implemented as a two-level configuration: a first warning indicating that the battery's (100) power is getting low; a second one indicating that the battery's (100) power is nearing a "critical power failure" condition. For example, the first warning may be issued when the PMU (900) estimates that battery (100) has a power reserve sufficient to operate for a further 30 minutes until total discharge (under normal operating conditions), while the second warning may be issued at 10 minutes before total discharge.

In operation, the battery (100) is initially charged using the connector (170). The cells (110) are monitored by the PCM's (120, 130, 140 and 150) and isolated from the charger (170) when fully charged. Upon the prosthesis being activated, the super capacitor (200) and electrolytic capacitors (300) are charged from the battery (100) with the in rush limiters (700 and 800) limiting the drain on the battery (100).

The initial locomotion of the amputee is secured by the sensors (42) and generates a control signal at the controller (46) to initiate the operation of the actuating mechanism (62). The power drive (52) determines the current required up to the maximum indicated by the saturation control line (916) and connects the power supply (54) to the mechanism (62). The electrolytic capacitors (300) provide the higher frequency components of the current supply with battery (100) recharging the electrolytic capacitors (300) as limited by the fast in-rush limiters (800). The inductor (400) inhibits current flow from the battery (100) and super capacitor (200) so that the demand is met by the electrolytic capacitors (300).

When the power drive (52) requires a high current, at a lower frequency, the super capacitor (200) supplies this, supplemented by battery (100) to meet the requirements.

The PMU (900) monitors the condition of the cells (110) and modifies the main power command in the power drive (52) as appropriate. If the condition of battery (100) indicates a critical energy level, the low power level indicators (960 and 970) are activated to allow the amputee to take appropriate action. Should the condition of the cells continue to deteriorate, the switch (164) is opened and the battery (100) is isolated.

Accordingly, it will be seen that the power supply (54) is effective to match the characteristics of the storage elements to the duty cycles and avoid permanent damage to the battery cells (110) by monitoring their performance and modifying the supply of power as appropriate.

It should be noted that the present invention is not limited to its use with an active prosthesis, other applications having high energy demands during short periods of time, such as, for example, cordless power tools, hobby planes and race carts, may also benefit from the above describe power supply.

Although the present invention has been described by way of particular embodiments and examples thereof, it should be noted that it will be apparent to persons skilled in the art that modifications may be applied to the present particular embodiment without departing from the scope of the present invention.

What is claimed is:

1. An electrical power supply for providing electrical power to a load, the power supply comprising:
   a plurality of energy storage elements each having a different operating characteristic and connected in an electrical circuit to said load;
   a circuit element interposed between at least one of said storage elements and said load and operable to segregate said one of said energy storage elements therefrom, said circuit element being selected to match supply of energy to said load to said characteristics of said storage elements; and
   a power monitoring unit to monitor power supplied by at least one of said energy storage elements to said load and control demand by said load for power from said at least one of said energy storage elements.

2. An electrical power supply according to claim 1 wherein said storage elements are connected in parallel and said circuit element is interposed between a pair of said storage elements.

3. An electrical power supply according to claim 2 wherein said power monitoring unit determines the maximum current to be supplied to said load.

4. An electrical power supply according to claim 2 wherein said power monitoring unit is operable to disconnect said one energy storage element from said circuit upon attainment of predetermined conditions.

5. An electrical power supply according to claim 2 wherein said one energy storage element is operable to replenish energy in another of said energy storage elements.

6. An electrical power supply according to claim 5 wherein power supply from said one storage element to said other of said storage elements is limited to match the characteristics of said one storage element.

7. An electrical power supply according to claim 1, wherein:
   said circuit element is an inductor.

8. An electrical power supply according to claim 1, wherein:
   the energy storage elements include at least one battery cell.

9. An electrical power supply according to claim 8, further comprising:
   a diode connected between the at least one battery cell and the load;
   wherein the diode inhibits in-rush currents from the load to the at least one battery.

10. An electrical power supply according to claim 8, wherein:
    the at least one battery cell is a Lithium Polymer cell.

11. An electrical power supply according to claim 1, wherein:
    the energy storage elements include at least one super capacitor.

12. An electrical power supply according to claim 1, wherein:
    the energy storage elements include at least one electrolytic capacitor.

13. An electrical power supply according to claim 1, further comprising:
    at least one in-rush current limiter connected to at least one of the energy storage elements.

14. An electrical power supply according to claim 1, further comprising:
    a shunt controller connected to the bus, the shunt controller having an associated resistor and an associated switch;
    wherein the shunt controller monitors the power supply's voltage level and closes its associated switch in response to a preset maximum voltage level being attained, the closing of the shunt controller's associated switch resulting in the dissipation of energy into its associated resistor.

15. An electrical A power supply according to claim 1, wherein:
    supply of power from said energy storage elements to said load is controlled by a power drive controller operable to match the current requirements from said storage elements with requirements of said load.

16. An electrical power supply according to claim 15, wherein: at least one of said energy storage elements is monitored by a power monitoring unit to match requirements of said controller to available power.

17. An electrical power supply according to claim 16 wherein said power monitoring unit provides a control signal to said power drive controller indicative of the power saturation level of said one of said storage elements.

* * * * *